Patented Aug. 11, 1953

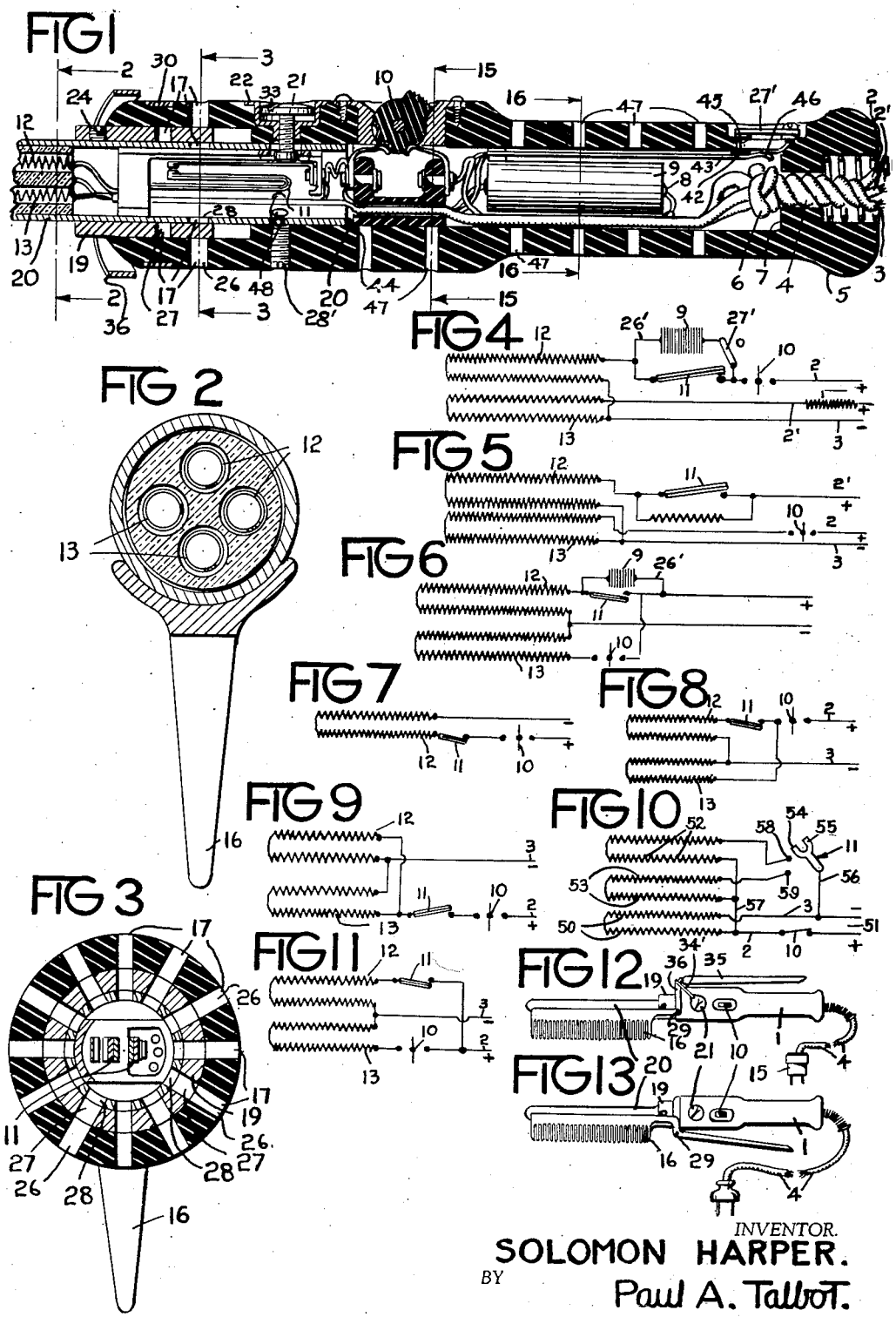

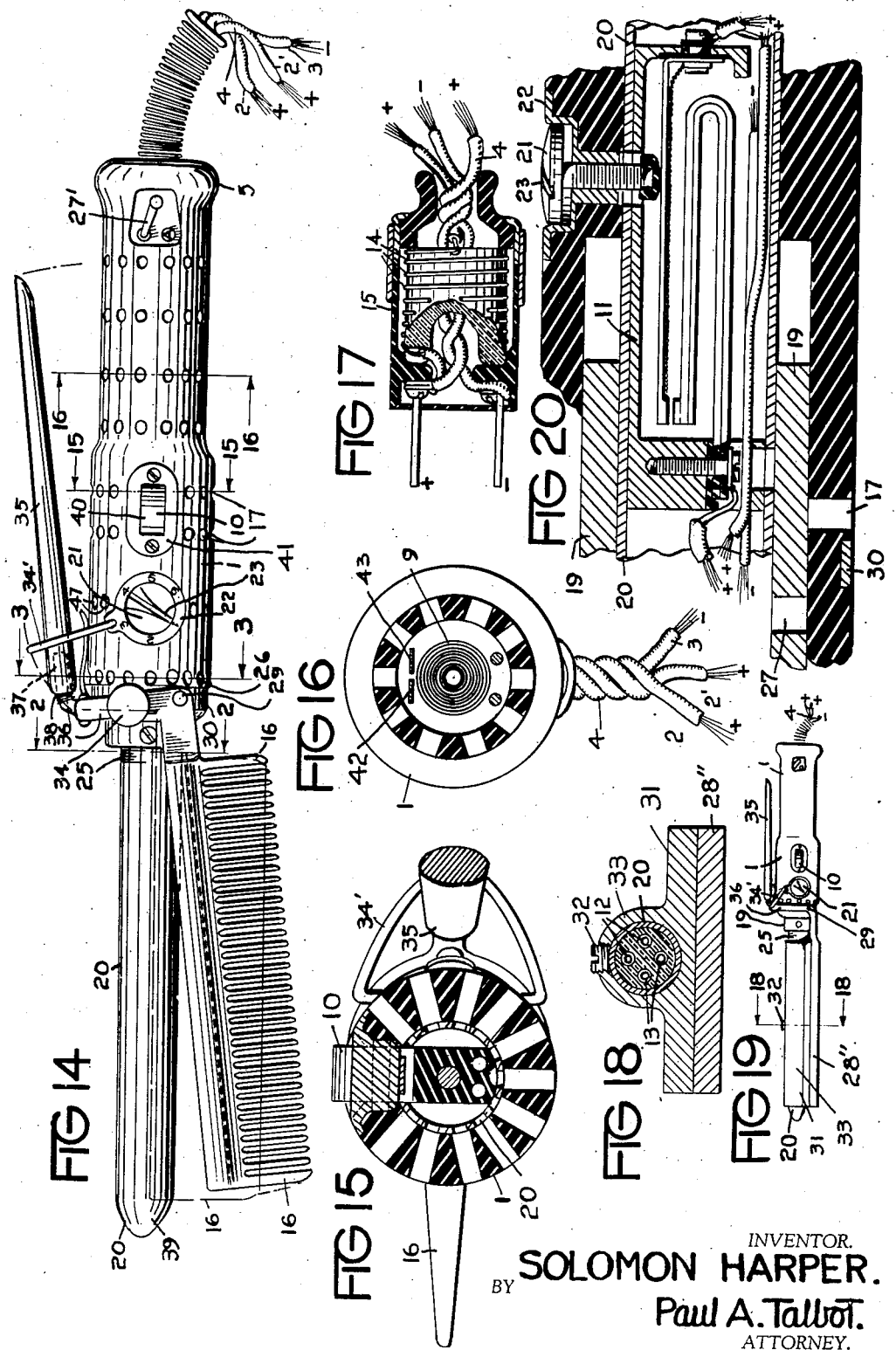

2,648,757

UNITED STATES PATENT OFFICE 2,648,757

THERMOSTATIC CONTROLLED HAIR CURLERS, COMBS, AND IRONS

Solomon Harper, New York, N. Y., assignor of ten per cent to Harold Watkiss, New York, N. Y.

Original application March 21, 1946, Serial No. 655,974. Divided and this application October 24, 1951, Serial No. 252,922

17 Claims. (Cl. 219—24)

My invention relates to hand operated electric heating devices such as hair curlers, straighteners, soldering irons, etc., and particularly to the regulation control of the heat (this is a division of application Serial Number 655,-974, filed under the title of Hand Appliance Heater Control, filed March 21, 1946), and has among its purposes and objects to provide:

An improved means by which the temperatures of the member heated electrically is maintained semi-automatically through the circuit connected through an automatic thermostat designed to cut off the electric circuit.

An improved means by which the heated member is simultaneously heated by a separate electrical circuit not connected through the thermostat.

Means by which the electrical current and heat provided in one circuit to the heated member may be equal, less or higher than the heat to the other members.

Means for two circuits to operate independently as a means for heating the heater member and to cause the temperature to rise or fall to a pre-determined degree.

An improved device whereby mechanical and electrical simplicity in design is so arranged to increase the efficiency and heat-maintaining characteristics of the heater.

Means by which the temperature in the hair-treating implement may be altered by curling, waving, drying, tinting, straightening, baking as desired by the operator.

Means to enable the operator to know approximately temperature to be obtained when part or all the current is connected to the heater.

Means to indicate the temperature beginning at low, through to medium and high to enable the operator to know the approximate temperature of the heater and to adjust it.

Means by which the thermostat controlling the opening and closing of one of the circuits may be the only means for opening and closing both of the circuits.

Means by which two independent electrical circuits in a heater may be connected to the line permanently by closing the electrical gap of a thermostat in one of the circuits.

Means by which an electrically operated thermostat may be used to control the electric current to one or more heater resistance coils in a hair-treating implement.

An electrical capacitor connected across the terminal points of an electrical thermostat controlling the temperature of one or more resistance coils in an electrical heater of hair-treating implements to prevent an arc.

An electrical heater consisting of one or more heating coils, one or both of which may be opened or closed by an electrical thermostat and also by manually operated switch.

An electrical heater for hair-treating implements whereby the temperature may be evenly maintained by an electrically operated thermostat, connected in series with one or more resistance coils.

Means by which a thermostat may be placed adjacent to the end of an electrical heater and to open and close an electrical circuit of a hair-treating implement.

Means by which an electrically operated thermostat may be caused to operate by the heater of hair-treating implements by moving the heated part closer to the thermostat.

Auxiliary means by which a thermostat, controlling the temperature of hair-treating implements may be caused to operate quicker or slower without the use of an adjusting screw.

Auxiliary means such as holes, slots, or other types of opening in the handle of a hair-treating implement controlled by a thermostat.

A series of auxiliary metal collars of various lengths and slidable on the heated chamber of a hair-treating implement for transferring or conducting additional heat to a thermostat cover.

Auxiliary collars to transfer heat to a thermostat in a hair-treating implement handle when a short or long hair-treating implement is used.

Auxiliary collars to which a long or short pressing part may be attached when the hair-treating implement is used for pressing or curling hair.

Means by which a cover tube may be placed over the hair-treating implement heater to provide means for using larger size combs or curler attachments to reduce the temperature of the attachment.

An electrical heated tube for hair-treating implements which is detachable from the handle by means of set screws and bushings in a handle holding a thermostat.

An electrically heated comb with a hollow back and short teeth made up of a low heat conducting material to prevent the tip end of the teeth from becoming too hot.

An electrically heated comb with a bowled out half back which can be secured to an electrically heated unit which is controlled by an adjustable thermostat.

A convenient thermostatically controlled electric heater for hair-treating implements such as combs, curlers, wavers, crimpers, dryers and hair-straightening devices.

Electric conduits and handles for electrical hair-treating and other implements such as soldering irons, curlers and other useful appliances which will permit the heating chamber of the heater to be secured to the conduits in the handle.

A handle for hair-treating implements which may not be removed easily from over a thermostat casing secured to the end of a bushing connecting the heater.

A handle for hair-treating implements which will not become overheated and to provide air holes in the handle which may be opened or closed.

Means by which electric current may be caused to flow into an electric heater through or around a thermostat and the amount of current to be reduced and not all cut off when the thermostat opens.

Means to connect a higher or lower resistance line around the thermostat directly to the heater unit, thereby permitting a reduced current to flow in the heater when the thermostat is opened.

A three wire resistance plug in the electric cord to the lines supplying the current to an electrical hair-treating implement in such a way as to cause the current to be varied slightly.

I accomplish these and other objects by the construction herein described and shown in the accompanying drawings forming a part thereof in which:

Fig. 1 is a longitudinal section of the handle and working parts within it.

Fig. 2 is a transverse section at 2—2 Figs. 1 and 14.

Fig. 3 is a transverse section at 3—3 Figs. 1 and 14.

Figs. 4, 5, 6, 7, 8, 9, 10, and 11 are electric diagrams of circuits which may be used in my device.

Fig. 12 is an elevation of my device showing a spring pressed appliance in relation to the heater.

Fig. 13 is an elevation of a grip pressed appliance in relation to the heater.

Fig. 14 is an elevation of my device.

Fig. 15 is a section at 15—15 Figs. 1 and 14.

Fig. 16 is a section at 16—16 Figs. 1 and 14.

Fig. 17 is a longitudinal section of a plug-in resister.

Fig. 18 is a transverse section at 18—18 Fig. 19.

Fig. 19 is an elevation showing a presser.

Fig. 20 is a fragmentary enlarged longitudinal section showing the thermostat.

Similar reference characters refer to similar parts throughout the several views of the drawings and in the specifications to follow.

I have limited the drawings and detailed disclosure to hand appliances such as heated combs, curling irons, and hair pressers and straighteners and fur glazers, I do not wish to be limited to the use nor wish my drawings and the details of construction to be considered as limiting the scope of my invention, but rather to illustrate one of the embodiments of the underlying principles of my invention which is set forth in the appended claims. To those skilled in the art to which may invention pertains, it will be obvious that the construction herein disclosed in detail may be modified in many ways to suit my device to the many uses to which it is adapted.

The size and shape of the parts which may be applied to my heating device with its handle and regulating mechanism may vary to suit the variety of uses to which it may be applied.

The demand for accuracy in regulating and maintaining the temperature of hand appliances and particularly those which are used in beauty culture and hair dressing and also fur glaziers has increased with their increased use and it is desirable, not only to shut the heat off to prevent overheating but also be able to accurately set the device at any one of several degrees of heat to suit the nature of the work to be performed and also to suit the type of hair being treated.

Soldering irons and similar devices which do not ordinarily require accurate regulation may be improved by such regulation.

Thermostats which may be set to control maximum heat are reduced in their useful life by continuously turning on and shutting off the electric circuits which they control so that it becomes desirable to provide additional means of regulation of heat to overcome the necessity of frequent operation of the thermostat and to this end regulating means of improvement is directed.

Referring to the drawings, the construction and operation of my device may be better understood by a study of the details of this disclosure.

I have provided a handle 1 of heat-insulating or poor heat conducting material in which the conduit or positive wires 2 or 2' and negative wire 3 are brought from the source of electric current which may be in the form of a plug-in cord 4 and then divided into three wires, 2, 2', 3 hereinafter more fully described; the nature and use of electric plugs are so common and so generally known as to require no detailed description. The cord 4 may be firmly secured within the handle 1 after entering its otherwise free end 5 by the knot 6 in the cord and shoulder 7, thereby preventing unusual jerks or pulling for disturbing the connection 8 to the interior parts, including the capacitor 9, as well as the other internal connections within the handle 1.

The capacitor may be connected with the switch 10 and shunted around the thermostat 11, as shown in the wiring diagram in Fig. 4 of the drawings, in which two pairs of heating elements 12 and 13 are shown. The heating elements 12 are connected to the thermostat, switch, and capacitor and may be of a greater capacity than the heating elements 13 which may be permanently heated. The heating plug 15 which divides the two positive circuits to the pairs of heating elements 12 in which, for instance, one circuit as above described may have the elements 12, thermostat 11, and switch 10 in series in the positive wire 12, and this pair of heating elements may be connected and further regulated by the positive wire 2' and the resistance 14 of the plug 15; both circuits may have as common negative wire 3, thus requiring but 3 wires, 2, 2' and 3 between the handle 1 and plug 15 forming the plug-in cord 4. The heating elements may also be connected to wires 2 and 3.

It will be noted that the switch 10 and thermostat 11 may serve to control one of the pairs of heating elements and is particularly useful in causing the desired control while my device is being manipulated and is in use; also that the other of the pairs of heating elements may be kept on continuously to maintain the desired heat when my device is not in use and being manipulated.

I have provided an additional means of controlling the temperature of my device comprising a slidable heat transmitting sleeve 19 and a further adjustment of heat control by ventilation holes 17 near the thermostat which is effected by the conduction of heat through the tube 20 which surrounds and is heated by the pairs of heating elements 12 and 13.

The several means of controlling the temperature are correlated when so combined, make it possible to provide the desired temperature for treating hair, either for curling or straightening the hair, even though one person's hair may require a much greater heat in its treatment than the hair of another person requires.

The thermostat may be adjusted to break open the circuit in which it is located at a wide range of temperatures and the adjustment 21 which may be a screw or other means is provided with a calibrated dial 22 and a pointer 23 permitting the thermostat 11 to be accurately set.

The frequent or intermittent opening and closing of the circuit in which the thermostat is located has been found undesirable not only because such frequent operation shortens the life of the thermostat but also because the heat change is also intermittent and not constant.

I overcome this objection by the use of my conducting or heat transmitting sleeve 19 which may be secured at the desired position on the conducting tube 20 by the set screws 24 and at the position for a guage marking scale near No. 25 which facilitates the desired adjustment for the varying requirements of heat, and such adjustment for the varying requirements of heat, and such adjustment substantially reduces the frequency of operation of the thermostat.

The ventilating holes 26 in the handle and ventilating holes in the sleeve 19, as well as the ventilating holes in the heat conducting tube 20, may all be brought into full or partial alignment at a position at which the sleeve 19 contacts the minimum of heat from the several heating elements to the thermostat which causes the heat to be increased to the maximum before the thermostat is effected. Conversely, the sleeve and ventilating holes may be set to carry the heat from the heating elements to the thermostat more freely, thereby causing it to operate sooner and to reduce the maximum temperature of my device.

The resistance 14 may be made adjustable in the form of a rheostat, or the third wire 2' may be made to provide the desired resistance.

The capacitor 9 may be provided in a shunt 26' around the thermostat for direct current and to facilitate my device for using either direct or alternating current. I have provided the set switch 27' which may connect or disconnect the capacitor.

The circuit most commonly used and which is illustrated in the several views of my device is shown in Fig. 4 of the drawings.

Fig. 5 shows a circuit for alternating current which is best suited to curling irons which ordinarily require less heat than thermostat 11 is provided with a resistance in the shunt around it and this circuit may be kept on, thus heating the heater 12 while the heater 13 may be switched on intermittently as is desired.

Fig. 6 shows circuits for direct current and particularly suited to use for combs and pressers.

Fig. 7 shows a circuit suitable for a single heater and for alternating current, and Fig. 8 shows a somewhat similar circuit for two heaters in which one of the circuits only is controlled by the thermostat and both circuits are controlled by the switch.

Fig. 9 shows a circuit for two heaters, both of which are controlled by the thermostat and switch.

Fig. 10 shows a plurality of heaters controlled by a thermostat which may open one circuit, then by further movement, another circuit, and still another circuit after further movement, thus controlling a plurality of heaters so that one after the other will be added or shut off in the heater of my device. This circuit is desirable for water heaters and sterilizers, also for combs.

Fig. 11 shows a circuit particularly suited to combs and is somewhat similar to the circuit shown in Fig. 6. The circuit shown in Fig. 11 is suited to alternating current.

The various circuits, diagrammatically shown in Figs. 4, 5, 6, 7, 8, 9, 10 and 11 illustrate some of those more commonly used in the regulation of the heat in the heater or tube 20, or that part of the tube projecting from the handle 1.

The heater as above described may be controlled by the switch, thermostat, and by resistance, variable or adjustable, or a rheostat, all of which are electrical, and by a movable conducting sleeve, and also by ventilating to change the air within the handle and particularly within that part of the handle near the end from which the heater projects. The zone or space surrounding the thermostat may be known as the thermostat chamber, as it is to be noted that heat is conducted to he chamber rather than directly to the expansion members of the thermostat.

This characteristic of indirect application of heat from the heater to the thermostat provides the means of regulation independent of the electrical control of heat to be most effective. The sleeve and ventilation near the thermostat provides an independent means as related to the electric control of heat.

The manually adjusted sleve 19 may, of course, be modified in numerous ways to change the amount of heat carried by conduction to increase or decrease the heat carried by conduction in the material of the tube 20. The sleeve may be revolved to change the air flow to the outside wall of the thermostat holder or a separate sleeve, or other means may be used to regulate the air flow independent of the movement of the sleeve 19.

The tube 20 may be withdrawn from the handle by unscrewing the set screw 28.

The comb may be removed and replaced with the presser 28'' (Fig. 18) by removing the pivot pins 29 which engage the clamp member 30 securing these and other movable appliances to the handle 1.

The fixed part 31 and various other appliances to be heated may be provided with a heating sleeve 33 which may be slipped over the heater.

The movable and removable parts such as presser 28'' and comb 16 may be locked in contact with the heated fixed or stationary part or the heater by locking screw 34 which prevents the movement of the movable handle 35 which may be detachably secured to the stirrup 36 which straddles the clamp member 30 and the handle 1 and to which the movable parts 16 are secured.

The stirrup may be provided with the threaded stud 37 which engages the threaded end 38 of the movable handle to detachably secure this handle to the stirrup and the movable parts such as the comb. The handle may thus be removed out of the operator's way when it is not desired.

The end 39 of the tube 20 is closed water tight to prevent leakage into the heating parts 12 and 13 so that my device may be used to heat water and also to sterilize the parts, such as the comb or the presser, etc.

The switch operator 40 may be removed by removing the operator plate 41 when removing the tube 20. The condenser connections 42 and 43 may be secured to and extended beyond the open end 44 of the tube 20 to engage the contact pieces 45 and 46 of the set switch 27'.

In addition to the ventilation holes 17 for adjusting the operation of the thermostat, the handle 1 and the tube 20 near its open end are provided the handle ventilating ducts 47 and the tube openings 48 which not only ventilate the interior of the tube to conduct heat from its heated end or heater. The switch capacitor and the handle are thus cooled.

I have not shown the many appliances which may be detachably secured to and heated by my device to suit the many uses to which it is suited.

My invention is set forth in the appended claims.

I claim:

1. In a heating device, a heat conducting tube, electric heating means in said tube, thermostatic means heated by surrounding air affected by the heat from said tube, said thermostatic means electrically controlling the heat of said tube and said heating means and a sleeve movable on said tube to control the temperature thereof by changing the conduction of heat from the portion of the tube surrounding said heating means and by admitting air to the tube.

2. In a heating device, a heat conducting tube, electric heating means in said tube, thermostatic means heated by surrounding air affected by the heat from said tube, said thermostatic means electrically controlling the heat of said tube and said heating means and a sleeve movable on said tube, said sleeve having air ventilating holes and said tube having vent holes which may register or be shut off by the movement of said sleeve.

3. In a portable heater, a heat conducting tube having electric heating means in one end and electric heat controlling means near the other end of said tube, and a sleeve movable on said tube to change the amount of heat conducted from the heated end of said tube to the heat controlling means of said tube, said heat controlling means controlled by the air surrounding it and said sleeve controlling the conduction of heat along said tube and also controlling the temperature of the air around said heat controlling means by the admission and mixture of external air to and in said tube.

4. In a heating device according to claim 2 said air being adjusted according to the position of said sleeve on said tube and the number of holes registered and not registered, a stationary handle with ventilating holes through walls near said sleeve, said handle extending over one end of said sleeve, said sleeve movable longitudinally further into said handle to open and close said ventilating holes in the end of said handle, said holes in said handle registering simultaneously with said holes in said sleeve and permitting ventilated cool air to contact said sleeve and said thermostatic means, said thermostatic means being affected by the movement of said sleeve and the position of said tube on said handle and the number of holes registered, said thermostatic means being affected by the amount of heat conducted by the tube, said air, and said sleeve, said thermostatic means affecting said electrical control of said electric heating means and said electric means affecting the temperature of said tube and said sleeve.

5. In a portable heater, according to claim 3, said tube affected by the length of said sleeve, a collar of required length, thickness and diameter movable on said tube to supplement the length of said sleeve and transfer heat to said sleeve.

6. In a portable heater, according to claim 3, a slip-over flat face attachment heated by said heating tube and movable on said tube and from said tube.

7. In a heating device, according to claim 2, a stationary handle having ventilating holes near one end of said sleeve, and said handle having air ventilating holes near said tube, a capacitor and a manual switch near one end of said sleeve, said ventilating holes and space inside said handle being obstructed by said manual switch and said capacitor; thereby, affecting the free circulation of cooling air, causing said handle and said thermostatic means' heat to become higher, said switch and capacitor affecting the heat of said handle in proportion to number of ventilating holes obstructed in said handle, said sleeve movable under said holes near said manual switch and affecting the temperature of said switch.

8. In a heating device according to claim 1, said heat conducting tube having a grooved back comb of the class described adjacent to said tube and absorbing heat from said tube, and affecting the heat of said tube in proportion to the length of said comb contacting said tube and the distance said sleeve is from one end of said comb when said comb is closed on said tube, and means for swinging said comb with respect to said tube.

9. In a heating device according to claim 4, a plurality of electric conducting means passing through said sleeve longitudinally, capacitor arc reducing means, and manual hand operated adjustable means for said thermostatic means, said manual hand operated adjustable means being on the outside circumference of said handle and removed from contact with the surfaces of said sleeve and said tube, said sleeve movable longitudinally over said electric conducting means, said tube heating said electric conducting means, and said tube heating said sleeve and said sleeve heating said electric conducting means, said sleeve and said conducting means cooled by said air ventilating holes, said manual hand operated adjustable heat control means having means to contact said thermostatic means, said heat control means having heat indicating means, said sleeve, said electric conducting means and said cool air ventilating holes and said capacitor arc reducing means and the position of all of the heat adjusting means being joint heat regulating means for said electric heating means proportional to the amount of heat from said electric heating means, said electric conducting means having leads connected to the ends of said capacitor means to retard said arc, one of said electric conducting means connected in series with said thermostatic means and said conducting means connected to a source of power.

10. In a heating device according to claim 4, a manual disconnecting and connecting means separated from said sleeve by said capacitor arc reducing means, said manual switch and said thermostatic means, said disconnecting and connecting means having means for connections to said electric conductors and said arc reducing means, said disconnecting and connecting means affecting said arc reducing means.

11. In a heating device according to claim 4, said comb having two pivoting positions providing for attaching said comb, and having handle means near one respective side and near one end of said sleeve to cause said comb to move in reverse directions according to movement of said handle when placed on an opposite side near one side and near one end of said sleeve.

12. In a heating device according to claim 4, said comb having means for pressing hair between said back of said comb and means for curling hair between said back and around curling means, said comb and said curling means having adjustable means for permitting said hair to be straightened and baked with heat controlled by said joint heat regulating means proportionally to movement of said comb to press and for curling and straightening said hair.

13. In a heating device according to claim 9, a power reducing means connected to and in series with one of said electric conducting means passing longitudinally thru said sleeve, said power reducing means affecting said joint heat regulating means, said reducing means being replaceable.

14. In a heating device according to claim 3, said sleeve being adapted to revolve within said handle and to affect the flow of air to and from said tube affecting the heat inside said handle.

15. In a heating device according to claim 3, said sleeve being adapted to move longitudinally, remain stationary and be revolved within one end of said handle to regulate said air ventilation.

16. In a heating device according to claim 9, said sleeve being adapted to revolve and move longitudinally in said handle to effect the regulation of said air supplemental to said joint heat regulating means said sleeve being adaptable and jointly affecting the control of said electric means in conjunction with rheostatic and adjustable resistance means removed from near said sleeve and said electric power reducing means.

17. In a heating device according to claim 8, said handle and said sleeve being adaptable to affect the said attachments including soldering means proportionally to said longitudinal movement, a number of ventilation holes in said tube, said sleeve and said handle.

SOLOMON HARPER.

References Cited in the file of this patent

UNITED STATES PATENTS

| Number | Name | Date |
|---|---|---|
| 1,416,544 | Barzen | May 16, 1922 |
| 1,446,653 | Murphy | Feb. 27, 1923 |
| 1,772,002 | Harper | Aug. 5, 1930 |
| 1,855,707 | De Langie | Aug. 26, 1932 |
| 2,106,756 | Obermaier | Feb. 1, 1938 |